United States Patent

[11] 3,632,269

[72] Inventors Peter L. Doviak
 Kendall Park;
 Frank Kalwaites, Somerville, both of N.J.
[21] Appl. No. 799,438
[22] Filed Feb. 14, 1969
[45] Patented Jan. 4, 1972
[73] Assignee Johnson & Johnson

[54] APPRATUS FOR PRODUCING A PLASTIC NET PRODUCT
2 Claims, 4 Drawing Figs.
[52] U.S. Cl. .................................................. 425/362,
 264/154, 425/331
[51] Int. Cl. ...................................................... B92d 7/04,
 B29d 7/14
[50] Field of Search........................................... 18/1 FE, 1
 FS, 2 C, 10, DIG. 53, DIG. 40, DIG. 37, DIG. 42;
 264/288, 154, 291, DIG. 70

[56] References Cited
 UNITED STATES PATENTS
2,514,213 7/1950 Mason et al. ................. 18/10
2,748,863 6/1956 Benton......................... 18/DIG. 37
2,957,200 10/1960 Pufahl et al..................... 18/9
3,007,207 10/1961 Salhofer........................ 264/288 X
3,072,961 1/1963 Gilbert......................... 18/10
3,085,292 4/1963 Kindseth....................... 18/10 X
3,129,457 4/1964 Carter et al.................... 18/10 X
3,137,746 6/1964 Seymour et al................. 264/DIG. 70
3,137,893 6/1964 Gelphe......................... 18/DIG. 37
3,208,100 9/1965 Nash........................... 18/1 FS
3,365,352 1/1968 Van Burleigh et al. ......... 264/288 X
3,430,291 3/1969 Hlinka......................... 18/10

Primary Examiner—Robert L. Spicer, Jr.
Attorneys—Alexander T. Kardos and Robert L. Minier ABSTRACT: A method and apparatus for producing a plastic net product from a thermoplastic film wherein the film is embossed while at an elevated temperature with an embossing roll having a resilient surface and the film is removed from the resilient embossing surface while simultaneously being cooled and drafted.

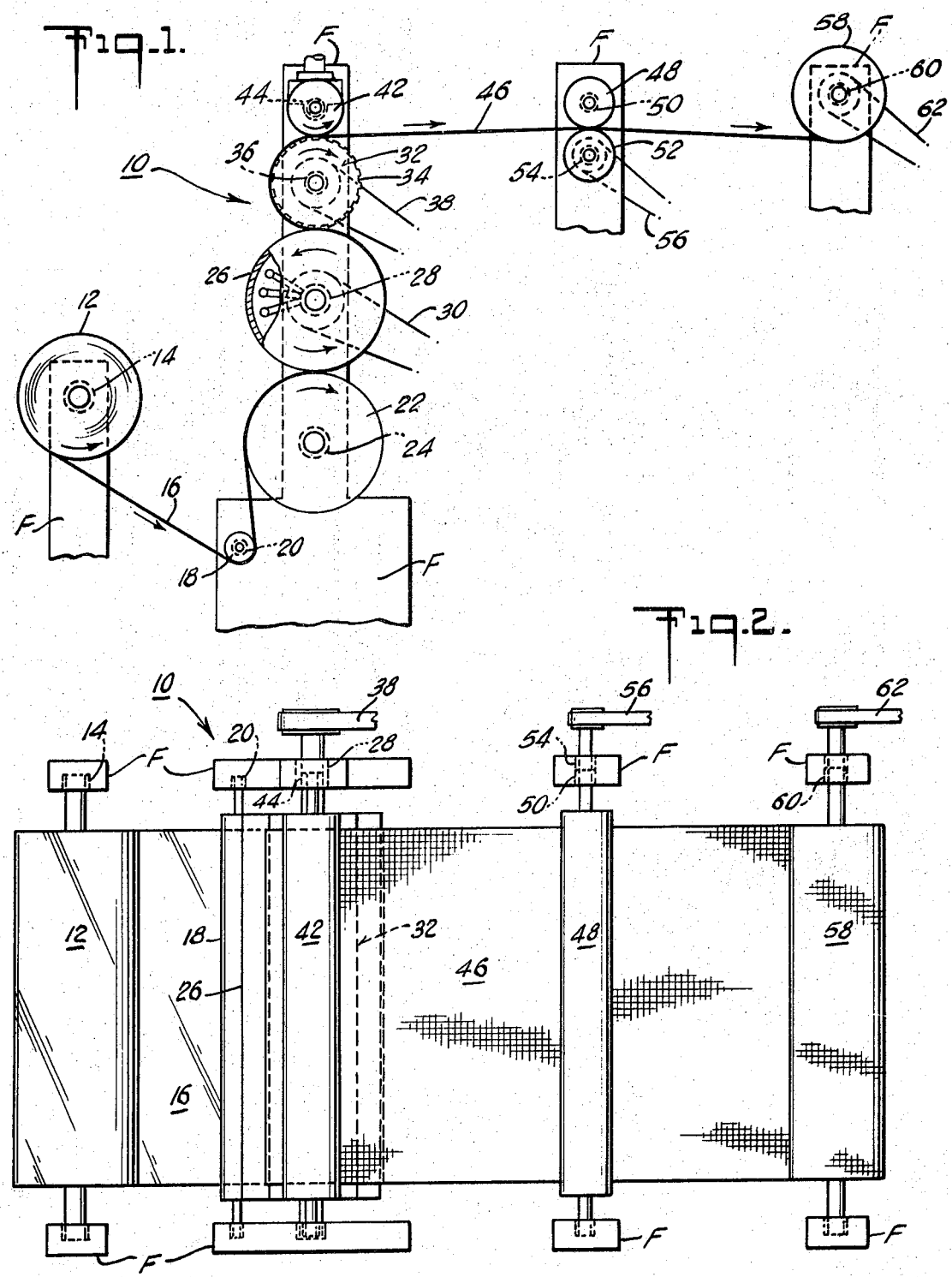

APPRATUS FOR PRODUCING A PLASTIC NET PRODUCT

This invention relates to method and apparatus for making plastic net products from thermoplastic films.

In recent years plastic netlike products have gained considerable acceptance for decorative end uses as substitutes for open mesh fabrics such as are used in the packaging of vegetables and other food products and in other products where great strength is not required. Up until the present time the majority of these plastic net products have been made by either taking a film and punching holes in the film in a desired pattern or by actually extruding the plastic net directly from the spinnerette. If the net is produced by standard perforating techniques there is considerable waste and this is extremely important in the type of products where such nets are used where cost is of prime importance, hence, there have been developed a number of techniques for rotating the various portions of the spinnerette in opposite directions in order to produce a layer of crossing filaments in a desired pattern. Examples of methods and apparatus for extruding such plastic nettings are shown in U.S. Pat. No. 3,012,275 to G. S. Nalle, Jr., issued Dec. 12, 1961 or U.S. Pat. No. 2,919,467 to Mercer. These techniques, of course, require moving dieheads and hence, are not the easiest methods to operate and control.

I have now discovered an improved method for making a plastic netting similar to that made by the processes described above; however, my method is extremely simple and can be operated at very high speeds and does not require any extrusion type apparatus or rotating dieheads or other complicated pieces of machinery.

In accordance with the present invention a thermoplastic film is heated to an elevated temperature. The temperature to which the film is heated must be greater than the melting point of the film and the film should be heated to a temperature of from 15° to 40° F. above its melting point in order to be suitably embossed. The film is then passed between a roll which may serve as a heating roll if desired and the embossing roll. The embossing roll has a resilient surface and is engraved with the pattern desired in the final plastic net product. The film is fed to the embossing rolls at a speed such that the film completely fills up the engraved area of the embossing roll, for example, if a very thick film is used it may be desirable to speed up the embossing roll so that there is not excess film being embossed whereas if a very thin film is used it may be desirable to slow down the embossing roll so that sufficient thermoplastic film is fed into the embossing rolls to fill up all of the engraved portion. The embossing is carried out at pressures of from about 10 to 30 pounds per linear inch although the amount of pressure used will be determined by the type of film being processed and the temperature. After being embossed, the embossed plastic film is removed from the embossing roll while it is allowed to cool slightly and is simultaneously drafted by a pair of nip rolls to produce the plastic net of the product of the present invention.

The invention will be further described in conjunction with the accompanying drawings wherein;

FIG. 1 is a side view of apparatus for carrying out the method of the present invention;

FIG. 2 is a top view of the apparatus of FIG. 1;

Figure 3:
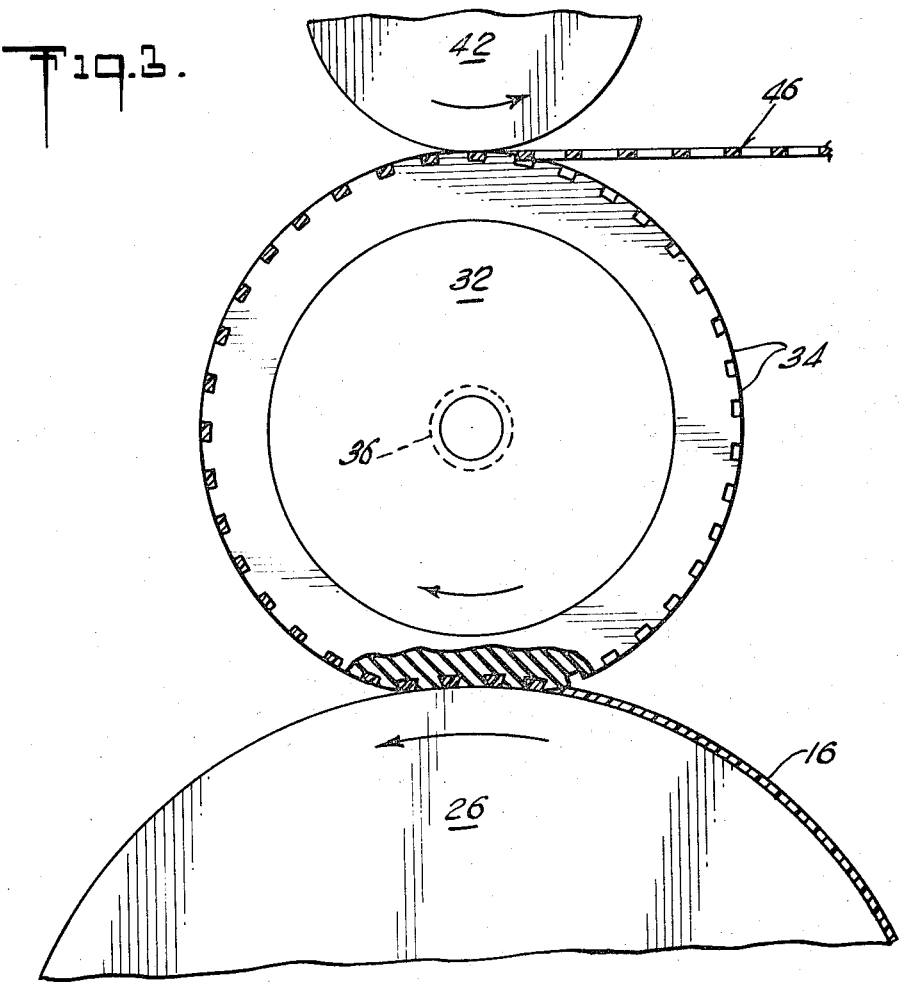
FIG. 3 is an enlarged cross-sectional view of the embossing roll having a resilient surface used in the method of the present invention.

Referring to the drawings, in FIGS. 1 and 2 a supply roll 12 of thermoplastic film 16 is mounted for rotation in bearings 14 mounted in suitable framing F. The film from the supply roll feeds about an idler roll 18 mounted in bearings 20 in suitable framing F. The film passes about a portion of the circumference of roll 22. The roll 22 is also mounted for rotation in bearings 24 mounted in suitable framing F. The film then passes about a portion of the circumference of a heated roll 26 which is also a pressure roll for the embossing. There is light pressure between the roll 22 and the heated roll 26. The heated roll is mounted for rotation in bearings 28 mounted in framing F and is driven by suitable pulleys 30 and motors. The rolls 22 and 26 are preferably Teflon covered to prevent any sticking of the thermoplastic film to the surface and the roll 26 may be heated by steam or oil or similar heating mediums which may be circulated through the roll. The heated roll may have virtually any diameter and of course the diameter will be controlled by the amount of heat desired to be imparted to the thermoplastic film as it passes about the surface of the roll. Roll diameters of 6 to 8 inches have been found suitable.

The heated roll raises the temperature of the thermoplastic film above its melting point. As discussed previously, the thermoplastic film may be raised to 15° to 40° F. above its melting temperature. The film must be heated sufficiently so as to soften the film and allow it to accept the embossing from the resilient surface embossing roll.

The embossing roll 32 is mounted for rotation in suitable bearings 36 mounted in the frame F and is driven by suitable drive means 38. The speed relationship between the embossing roll and the heated roll must be such that the film will fill up the pattern 34 in the embossing roll, in other words, if a very thick film is being processed the embossing roll should run faster than the heated roll so that the crevices are filled, whereas if a very thin film is being processed the embossing roll may run at a speed slower than the heated roll in order to insure that the pattern in the embossing roll is filled.

Most satisfactory results have been obtained by running the embossing roll slightly faster than the heated roll at a speed of embossing roll to heated roll of from about 1.1:1 to 1.2:1. The embossing roll may be of any desired diameter and generally diameters of from about 3 to 6 inches have been found satisfactory. The embossed film is carried about the circumference of the embossing roll and passes between the nip formed by another idler roll 42 mounted for rotation, mounted in bearings 44 in the framing F. Hydraulic means or other means, not shown for the sake of clarity, are used to put pressure between the nip of the idler roll and the embossing roll and also at the nip between the embossing roll and the heated roll. The use of the idler roll to place pressure across the entire length of the embossing roll gives excellent control of the pressure applied. Pressures of from about 12 pounds per linear inch to 24 pounds per linear inch have been found satisfactory in processing thermoplastic films.

The plastic netting 46 thus formed is passed from the idler roll and embossing roll to a pair of nip rolls 48 and 52 mounted for rotation in bearings 50 and 54 mounted in suitable framing F with one of the nip rolls 54 driven by standard drive means 56. The nip rolls have a linear speed slightly greater than the linear speed of the embossing roll so that if the film now patterned into a plastic netting is slightly drafted and any window paning is removed. Differential speeds between the nip rolls and the embossing roll of from about 1.1:1 to 1.2:1 have been satisfactory. If the differential speed is less than 1.1:1 the film will not adequately open and there will be some window paning left, whereas if the speed is greater than 1.2:1 the net will start to break as this area is not heated and the plastic netting is starting to chill. If the plastic netting is kept at an elevated temperature during this operation it would become oriented in the direction of its length during the process. The plastic netting is then fed to standard takeup roll means 58 mounted for rotation in bearings 60 mounted in suitable framing F and driven by standard drive means 62.

The thermoplastic films which may be processed in accordance with the present invention from which plastic nettings may be formed are any of the various well known thermoplastic films such as the polyolefins, that is the polyethylenes, polypropylenes, polyamides, and polyesters, etc.

Referring to FIG. 3, an extremely important step in my process is the embossing with a roll having a resilient surface. The thermoplastic film being processed is close to its melting temperature and hence, has become sticky and tends to stick to the surface of the rolls. By using a resilient rubber surface roll having a pattern of engraving on its surface the pressure being applied during the embossing tends to cause the film to follow the resilient surfaced embossing roll. It is believed this phenomena is caused by the edges of the walls on the outermost surface of the embossing roll tending to converge at a greater angle wen pressure is applied than their original angle. This grips the thermoplastic film and causes it to follow the embossing roll. Both walls may converge more or just one wall may do this depending on speed, pattern of embossing and resiliency of surface. As shown in FIG. 3 the resilient surface 34 of the embossing roll 32 when under pressure forms a keystone cross-sectional shape. The thermoplastic film 16 fills the keystone-type pattern and it is believed this keystone pattern carries the sticky film with the embossing roll. Immediately upon release of this pressure the keystones are removed from the resilient surface yet allowing the film to be carried thereby as previously described.

The preferred resilient surface is rubber as there are many rubbers which have the desired resiliency and will maintain the desired temperatures at which thermoplastic films are processed without deterioration. Another advantage of the resilient surface is the elimination of the problem of heat warping between metal rolls which is a common problem when embossing with metal rolls. The rolls may be true at room temperature; however, when the rolls are raised to elevated temperatures there is slight warping and misalignment between the surface of the rolls which reduce the efficiency of embossing. This is not true when utilizing a resilient surface roll 32 which will more or less take the alignment of the bottom harder surface roll 26 and still produce efficient embossing.

The film, after being embossed to form the plastic netting 46, must be slightly drafted before it is completely cooled. This draft aids in removing the net from the embossing resilient surface roll. It also eliminates any window paning in the net to produce the desired plastic net process. Drafts of from about 1.1:1 to 1.2:1 have been found satisfactory.

Figure 4:
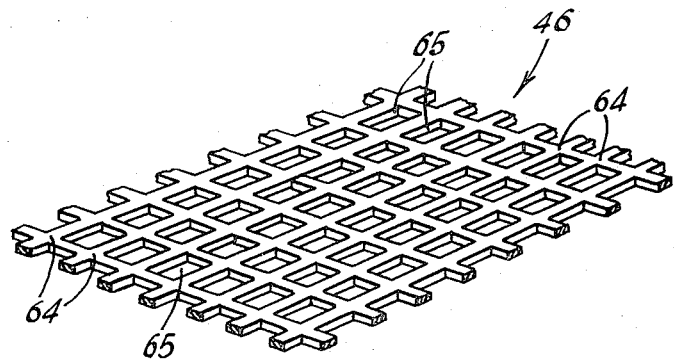
FIG. 4 is a view in perspective of a plastic netting made in accordance with the present invention.

In FIG. 4 there is shown a plastic net 46 of the present invention. The net comprises areas 64 having the pattern as provided by the embossing roll and separated by open areas 65.

In the drawings, complete drive means such as motors, pulleys, sprockets, and the like, have not been illustrated for all of the rolls nor have the various pressure-applying means been illustrated for all of the rolls. It must be understood that this has been done because such drive means and pressure means are conventional and well known in the art. Furthermore, all of the frames and support means are not shown and, again, this is done because they are conventional and well known in the art. It is believed the omission of these parts in the drawings makes the figures less complicated and easier to read and understand.

This invention will be further illustrated in detail by the following specific examples. It should be understood however, that although these examples may describe in particular detail some of the more specific features of the invention they are given primarily for purposes of illustration and the invention in its broader aspects is not to be construed as limited thereto.

EXAMPLE I

A polyethylene film having a thickness of 6 mils and made from general grade polyethylene as sold by Union Carbide Corporation as DKPCO127–NT7 and having a melt index of approximately 80 is fed to the apparatus depicted in the drawings, i.e., FIGS. 1 and 2. The film passes about the idler roll and over a portion of the periphery of the roll 22 which is at a temperature of about 185° F. The film passes from the first roll about a portion of the heated roll which is maintained at a temperature of 318° F. by circulating oil. The heated roll is driven to produce a peripheral linear speed of 4.5 feet per minute. The heated film passes between the nip formed by the embossing roll and the heated roll. The pressure at this nip is 12 pounds per linear inch. The embossing roll is covered with rubber and has a pattern engraved in the resilient rubber surface of 20 parallel lines (raised portion) per inch running about the circumference of the roll with the parallel lines having a thickness of 0.030 inch and being spaced 0.020 inch apart. The groove between lines is 0.020 inch deep. A pattern of 20 parallel lines also runs in the direction of the axis of the rolls. These lines are also 0.030 inch in thickness and are spaced 0.020 inch apart with the depth of groove of 0.020 inch. The embossing roll is not heated but the embossing roll is run at a peripheral linear speed of 5.4 feet per minute so that the film completely fills the engraved pattern in the resilient embossing roll. The embossed film passes about a portion of the circumference of the embossing roll and between the nip formed by the idler roll which is pressing against the embossing roll and causing the pressure between the embossing roll and the heated roll. The pressure at this nip is also 12 pounds per linear inch. The embossed film is removed from the embossing roll by a pair of nip rolls which have a peripheral linear speed of 5.7 feet per minute and the plastic net produced is wound up on a standard windup means.

The plastic net produced makes an excellent packaging material for various vegetables or other bulky items.

EXAMPLE II

A polypropylene film 10 mils in thickness is produced by standard extrusion techniques using a general purpose grade, heat stabilized polypropylene having a melt index of 4.5. The film is processed as described in example I with the following exceptions. The temperatures of the heated roll is 355° F. The pattern on the embossing roll is 10 by 10 lines per inch with the land width 0.060 inch, groove width 0.040 inch, and groove depth 0.028 inch. The heated roll is run at a peripheral linear speed of 3 feet per minute and the embossing roll is run at a peripheral linear speed of about 3 feet per minute. The pair of nip rolls is run at a peripheral linear speed of 3.2 feet per minute.

The plastic net produced makes an excellent starting material for producing an oriented netting by stretching in both the long and cross direction to orient the net in these directions and give the final product excellent strength so that it may be used as a reinforcement for paper or nonwoven fabrics.

It should be further understood that the above examples are for the purposes of illustration only and are not to be used to delineate the breadth sr scope of the invention. The invention is only limited by the scope of the claims appended hereto.

We claim:

1. Apparatus for producing plastic net from thermoplastic film comprising: a first rotatable roll rotating at a first peripheral linear speed, means for heating said first rotatable roll, a second rotatable roll having a resilient, embossed surface in contact with said first rotatable roll and having its axis parallel to said first rotatable roll, said second rotatable roll rotating at a peripheral linear speed greater than the peripheral linear speed of the first rotatable roll, means for applying pressure to the rotatable rolls whereby film passing between the rolls is embossed and gripped by said second rotatable roll and means for removing the embossed film from second rotatable roll while simultaneously increasing the speed of the film in the direction of its length.

2. Apparatus for producing plastic net from thermoplastic film comprising: a first rotatable roll rotating at a first peripheral linear speed, means for heating said first rotatable roll, a second rotatable roll having a resilient, embossed surface in contact with said first rotatable roll and having its axis parallel to said first rotatable roll, said second rotatable roll rotating at a peripheral linear speed less than the peripheral linear speed of the first rotatable roll, means for applying pressure to the rotatable rolls whereby film passing between the rolls is embossed and gripped by said second rotatable roll and means for removing the embossed film from the second rotatable roll while simultaneously increasing the speed of the film in the direction of its length.